(12) United States Patent
Crean

(10) Patent No.: US 6,505,873 B1
(45) Date of Patent: Jan. 14, 2003

(54) SYSTEM FOR PREVENTING DAMAGE TO RECREATIONAL VEHICLE SLIDE-OUTS

(75) Inventor: Johnnie Robert Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

(21) Appl. No.: 09/730,901

(22) Filed: Dec. 6, 2000

(51) Int. Cl.$^7$ ................................................ B60R 27/00
(52) U.S. Cl. ................. 296/26.13; 296/165; 296/26.01; 52/67; 340/425.5; 367/909
(58) Field of Search ........................... 296/26.09, 26.01, 296/26.1, 26.12, 26.13, 26.14, 26.15, 165, 171, 172, 176; 52/67; 340/425.5, 435, 436, 438; 367/909

(56) References Cited

U.S. PATENT DOCUMENTS

| | | |
|---|---|---|
| 1,536,518 A | 5/1925 | Osborn |
| 2,150,615 A | 3/1939 | Sword |
| 2,177,394 A | 10/1939 | Pierce |

(List continued on next page.)

FOREIGN PATENT DOCUMENTS

| | | |
|---|---|---|
| CH | 353262 | 9/1957 |
| DE | 42 04 640 A | 8/1993 |
| GB | 616274 | 1/1949 |
| GB | 2088789 | 11/1980 |
| GB | 2 260 951 | 5/1993 |
| IT | 478931 | 5/1951 |

OTHER PUBLICATIONS

Carefre, the World's Greatest Selection of RV Awnings, Sidewinder II, vol. 8, Issue 1, p. 19, 1997.

Brochure: Ideal from Alfa, 11/96.

Primary Examiner—Joseph D. Pape
(74) Attorney, Agent, or Firm—Knobbe, Martens, Olson & Bear, LLP

(57) ABSTRACT

A recreational vehicle having an extendable slide-out controlled by an actuator assembly is provided with a damage avoidance system. The damage avoidance system determines if the slide-out is in an adverse state and, if the adverse state is detected, inhibits the actuator assembly from moving the slide-out. The slide-out is in the adverse state if (a) a collision between the slide-out and a nearby object is imminent, (b) a collision has recently occurred, or (c) a resistive force is acting on the slide-out which substantially inhibits the actuator assembly from moving the slide-out. The damage avoidance system comprises a sensor module for monitoring the state of the slide-out and for providing an override signal to the actuator assembly, wherein the override signal is indicative of the slide-out being in the adverse state. In one embodiment, the sensor module comprises a position sensor disposed adjacent an interior swivel chair of the recreational vehicle, wherein the sensor module generates the override signal if the position sensor detects that the chair is not facing forward. In another embodiment, the sensor module comprises a shock sensor coupled to the slide-out. In yet another embodiment, the sensor module comprises a load sensor that monitors the mechanical load imposed on the actuator assembly.

27 Claims, 10 Drawing Sheets

U.S. PATENT DOCUMENTS

| | | | |
|---|---|---|---|
| 2,225,319 A | 12/1940 | Rollo | |
| 2,606,057 A | 8/1952 | Johnson | |
| 2,639,187 A | 5/1953 | Grumbache | |
| 2,704,223 A | 3/1955 | Houdart | |
| 2,788,791 A | 4/1957 | Pospisil et al. | |
| 2,876,035 A | 3/1959 | Houdart | |
| 3,106,750 A | 10/1963 | Jarman | |
| 3,165,350 A | 1/1965 | Willson | |
| 3,254,914 A | 6/1966 | Steck | |
| 3,287,058 A | 11/1966 | Wells | |
| 3,300,839 A | 1/1967 | Lichti | |
| 3,341,986 A | 9/1967 | Brosig | |
| 3,565,480 A | 2/1971 | McCollum et al. | |
| 3,572,809 A | 3/1971 | Buland | |
| 3,608,954 A | 9/1971 | Lynd | |
| 3,719,386 A | 3/1973 | Puckett et al. | |
| 3,735,998 A | 5/1973 | Green | |
| 3,740,088 A | 6/1973 | Ratcliff | |
| 3,801,138 A | 4/1974 | Quick | |
| 3,825,281 A | 7/1974 | Howard | |
| 3,850,470 A | 11/1974 | Trelle | |
| 3,887,220 A | 6/1975 | Hall | |
| 3,895,726 A | 7/1975 | Rassieur | |
| 3,902,752 A | 9/1975 | Pelletier | |
| 3,915,492 A * | 10/1975 | Agnese | |
| 3,918,510 A | 11/1975 | Hayward | |
| 3,959,985 A | 6/1976 | Schulze, Sr. | |
| 4,014,586 A | 3/1977 | Swofford | |
| 4,106,732 A | 8/1978 | Whiting | |
| 4,108,326 A | 8/1978 | Bertolini | |
| 4,109,954 A | 8/1978 | Wall | |
| 4,147,379 A | 4/1979 | Winslow | |
| 4,175,576 A | 11/1979 | Iby | |
| 4,322,108 A | 3/1982 | McPherson | |
| 4,457,554 A | 7/1984 | Fuisz et al. | |
| 4,468,823 A | 9/1984 | Tounjian | |
| 4,480,866 A | 11/1984 | Komatsu | |
| 4,500,132 A | 2/1985 | Yoder | |
| 4,550,946 A | 11/1985 | Hanemaayer | |
| 4,589,463 A | 5/1986 | Ryan | |
| RE32,262 E | 10/1986 | Stewart | |
| 4,652,041 A | 3/1987 | Barber et al. | |
| 4,653,125 A | 3/1987 | Porter | |
| 4,719,954 A | 1/1988 | Curtis et al. | |
| 4,728,144 A | 3/1988 | Crean | |
| 4,729,594 A | 3/1988 | Hoff | |
| 4,746,164 A | 5/1988 | Crean | |
| 4,772,063 A | 9/1988 | Amy | |
| 4,776,631 A | 10/1988 | Sargent et al. | |
| 4,841,897 A | 6/1989 | Claflin | |
| 4,867,502 A | 9/1989 | Sylvester et al. | |
| 4,955,661 A | 9/1990 | Mattice | |
| 4,957,323 A | 9/1990 | Johnson | |
| 4,960,299 A | 10/1990 | Steadman | |
| 4,971,355 A | 11/1990 | Studdard | |
| 4,974,899 A | 12/1990 | Sargent | |
| 5,028,072 A | 7/1991 | Lindsay | |
| 5,061,001 A | 10/1991 | Madden et al. | |
| 5,090,749 A | 2/1992 | Lee | |
| 5,100,196 A | 3/1992 | Dodgen | |
| 5,100,716 A | 3/1992 | Juneau | |
| 5,112,082 A | 5/1992 | Clelland | |
| 5,143,418 A | 9/1992 | Fouquet | |
| 5,171,056 A | 12/1992 | Faludy et al. | |
| 5,199,120 A | 4/1993 | Holmes | |
| 5,237,782 A * | 8/1993 | Cooper | |
| 5,242,185 A | 9/1993 | Carr et al. | |
| 5,248,005 A | 9/1993 | Mochizuki | |
| 5,280,990 A | 1/1994 | Rinard | |
| 5,291,701 A | 3/1994 | Delacollete et al. | |
| 5,358,298 A | 10/1994 | Fate | |
| 5,374,094 A | 12/1994 | Smith et al. | |
| 5,401,050 A | 3/1995 | Baker | |
| 5,403,063 A | 4/1995 | Sjostedt et al. | |
| 5,419,607 A | 5/1995 | Oliveira | |
| 5,516,182 A * | 5/1996 | Aragon et al. | |
| 5,529,825 A | 6/1996 | Sutherland | |
| 5,560,444 A | 10/1996 | Tiedge | |
| 5,566,918 A | 10/1996 | Becker | |
| 5,620,224 A | 4/1997 | DiBiagio et al. | |
| 5,634,683 A | 6/1997 | Young | |
| 5,658,031 A | 8/1997 | DiBiagio et al. | |
| 5,658,032 A | 8/1997 | Gardner | |
| 5,673,962 A | 10/1997 | Maieli et al. | |
| 5,706,616 A | 1/1998 | Fernandez | |
| 5,718,253 A | 2/1998 | McNamee | |
| 5,734,336 A * | 3/1998 | Smithline | |
| 5,746,473 A | 5/1998 | Crean | |
| 5,785,373 A | 7/1998 | Futrell et al. | |
| 5,788,306 A | 8/1998 | DiBiagio et al. | |
| 5,791,715 A | 8/1998 | Nebel | |
| 5,791,726 A | 8/1998 | Kaufman | |
| 5,800,002 A | 9/1998 | Tiedge et al. | |
| 5,833,294 A | 11/1998 | Williams et al. | |
| 5,894,698 A | 4/1999 | Dewald, Jr. et al. | |
| 5,902,001 A | 5/1999 | Schneider | |
| 5,915,774 A * | 6/1999 | Tiedge | |
| 5,934,026 A | 8/1999 | Green | |
| 5,940,012 A * | 8/1999 | Studebaker | |
| 5,951,082 A | 9/1999 | DiBiagio et al. | |
| 5,983,576 A * | 11/1999 | Hanser et al. | |
| 6,007,132 A * | 12/1999 | Gehman et al. | |
| 6,007,142 A | 12/1999 | Gehman et al. | |
| 6,098,346 A | 8/2000 | Miller et al. | |
| 6,158,794 A | 12/2000 | Flanagan | |
| 6,170,903 B1 | 1/2001 | Crean | |
| 6,231,115 B1 | 5/2001 | Crean | |
| 6,260,909 B1 | 7/2001 | Crean et al. | |
| RE37,351 E | 9/2001 | Crean | |
| 6,293,612 B1 | 9/2001 | Crean | |
| 6,345,854 B1 * | 2/2002 | McManus | 296/26.13 |

* cited by examiner

SYSTEM FOR PREVENTING DAMAGE TO RECREATIONAL VEHICLE SLIDE-OUTS

BACKGROUND OF THE INVENTION

1. Field of the Invention

The present invention relates to recreational vehicles having extendable slide-outs and, in particular, relates to a recreational vehicle having a damage avoidance system that reduces the likelihood that the vehicle will be damaged as a result of the slide-out colliding with an object disposed in the path of the slide-out.

2. Description of the Related Art

Recreational vehicles are becoming more popular with individuals who wish to travel in comfort on the open road. Recreational vehicles provide individuals with a generously sized interior living space that can accommodate many of the amenities of home such as a kitchen, a living room, a bedroom and a bathroom. To provide increased interior space, recreational vehicles often include one or more slide-out members that can be extended from the vehicle to enlarge the interior living space and retracted inside the vehicle to reduce the exterior profile of the vehicle so as to allow the vehicle to travel on public roads.

Typically, the slide-out is controlled by a powered actuator assembly that moves the slide-out between the retracted and deployed positions such that a user is able to move the slide-out by simply pushing a button. For example, FIG. 3 schematically illustrates a typical actuator assembly 10 of a recreational vehicle of the prior art. The typical actuator assembly comprises a motor 12 that is coupled to a slide-out 14 by way of a movement arm 16. When the motor is activated, the motor directs the arm to apply a force onto the slide-out which moves the slide-out in a linear manner along an axis extending from the vehicle. The typical actuator assembly further comprises a switching element 18 that is disposed within the interior of the recreational vehicle so as to be accessible to the user. The switching element is coupled to the motor such that activation of the switching element by the user results in activation of the motor. Typically, the switching element comprises a three-way switch that, when placed in a first activated state by the user, causes the slide-out to be moved to the retracted position, and that, when placed in a second activated state by the user, causes the slide-out to be moved to the deployed position.

Unfortunately, if an object is disposed in the path of the slide-out when the slide-out is being repositioned, the slide-out will collide with the object. If the object is large or immovable, large forces could be exchanged between the slide-out and the object. Thus, it is possible that the slide-out and the object disposed in the path of the slide-out may be damaged as a result of such a collision. Moreover, if the slide-out is blocked by the object and the user is unaware that the slide-out is in an immovable state, continued activation of the electric motor could damage the actuator assembly.

This problem can result in compromises being made in the manufacturing and design of the recreational vehicle. For example, motor home vehicles often have captain's chairs located in the driver and front passenger position. These can be very large chairs of fairly rigid construction. When the vehicle is in motion, these chairs are facing forward. However, when the vehicle is stationary, these chairs are often rotated 180 degrees so as to function as lounge chairs in the motor home.

Typically, the chairs extend inward into the living space of the motor home a greater distance than when facing forward during travel of the vehicle. As such, these chairs can be positioned in the path of travel of an interior wall of a slide out member such that, if the chairs are not turned around into their driving position prior to retraction of the slide out, the slide out can hit a chair. This can result in damage to either the chair or the slide out as discussed above. It will be appreciated that remembering to rotate the chairs prior to retraction of the slide out is often overlooked by motor home vehicle owners in the face of all of the other tasks that must be accomplished in readying the motor home for travel.

To address this problem, the motor home designer often designs the slide out so that it does not extend into the position wherein the slide out will contact the chair. Unfortunately, this results in a lessening of the overall length of the motor home slide out thereby reducing the available living space of the motor home. Available living space in motor homes and other recreational vehicles is already at a premium due to the size constraints imposed on the vehicle for travel.

From the foregoing, it will be appreciated that there is a need for a recreational vehicle having a slide-out that is less likely to become damaged as a result of the slide-out colliding with an object disposed in the path of the slide-out. In particular, there is a need for the recreational vehicle to include a damage avoidance system that detects either a collision or an imminent collision between the slide-out and an object disposed in the path of the slide-out. Furthermore, upon detecting such events, the damage avoidance system should disable the actuator assembly so that the possibility of damage to the slide-out, the object, and the actuator assembly is reduced.

SUMMARY OF THE INVENTION

According to one aspect of the present invention, the aforementioned needs are satisfied by a recreational vehicle comprising a chassis having a plurality of rotatable wheels extending therefrom, and a main housing member disposed above the chassis. The main housing member comprises a plurality of walls that define a main interior living space therebetween and an opening that extends from the main interior living space. The recreational vehicle further comprises a slide-out member disposed within the opening of the main housing member. The slide-out member comprises a plurality of walls that define a supplemental living space therebetween. The slide-out member is movable between (a) a retracted position such that a substantial portion of the slide-out is disposed within the main interior living space and (b) a deployed position such that a substantial portion of the slide-out is disposed outside of the main interior living space so as to provide the vehicle with an increased overall living space that includes the main interior living space of the main housing member and the supplemental living space of the slide-out member. The recreational vehicle further comprises an actuator assembly that, when activated, urges the slide-out member to move between the retracted position and the deployed position. The recreational vehicle further comprises a damage avoidance system that reduces the likelihood that the slide-out member will be damaged as a result of the slide-out member colliding with a nearby object disposed in the path of the slide-out member.

In one embodiment, the damage avoidance system comprises a sensor module that detects if the slide-out member is in an adverse state. In particular, the slide-out member is in the adverse state if: (a) the nearby object is disposed in the path of the slide-out member, (b) the slide-out member has already collided with the nearby object, or (c) abnormally large resistive forces are acting on the slide-out member.

In another aspect of the invention, a method is provided which reduces the likelihood that a slide-out member of a recreational vehicle will be damaged as a result of the slide-out member colliding with a nearby object disposed adjacent the slide-out member. The method comprises detecting if the slide-out member is in an adverse state. If the adverse state is detected, a movement mechanism of the recreational vehicle is inhibited from applying a force onto the slide-out member.

In one embodiment, detecting if the slide-out member is in the adverse state comprises detecting if the nearby object is disposed in the path of the slide-out member. In another embodiment, detecting if the slide-out member is in the adverse state comprises detecting if the slide-out member has collided with the nearby object. In yet another embodiment, detecting if the slide-out member is in the adverse state comprises detecting the presence of abnormally large resistive forces acting on the slide-out member.

From the foregoing, it should be apparent that the recreational vehicle of the present invention is less likely to damaged during use. In particular, because the actuator assembly is inhibited from applying a force onto the slide-out member when the damage avoidance system detects that the nearby object is disposed in the path of the slide-out member, the likelihood that the slide-out member will collide with the nearby object is substantially reduced. Moreover, because the damage avoidance system inhibits the actuator assembly from applying a force onto the slide-out member in response to detecting the occurrence of a collision between the slide-out member and the nearby object, the likelihood that the slide-out member will be damaged subsequent to the collision is reduced. These and other objects and advantages of the present invention will become more apparent from the following description taken in conjunction with the accompanying drawings.

DETAILED DESCRIPTION OF THE PREFERRED EMBODIMENT

The present invention comprises a recreational vehicle having a damage avoidance system for reducing the likelihood that the vehicle will be damaged as a result of a slide-out member of the vehicle colliding with an object disposed in the path of the vehicle. In this application, the term "recreational vehicle" is intended to cover both self-powered recreational vehicles as well as recreational travel trailers that are towed by a second vehicle.

Reference will now be made to the drawings wherein like numerals refer to like parts throughout. FIGS. 1A–1B and 2A–2B illustrate the preferred embodiments of a recreational vehicle 30 in accordance with the present invention. In one embodiment (FIGS. 1A, 2A and 2B), the recreational vehicle 30 is self-propelled and, in another embodiment (FIG. 1B), the recreational vehicle 30 is towable behind a second vehicle. The recreational vehicle 30 includes an extendable slide-out unit 50 that can be extended to provide users with a spacious interior living space 31 (FIG. 2B) and retracted to allow the vehicle 30 to travel on a public road (FIG. 2B).

Figure 1A:
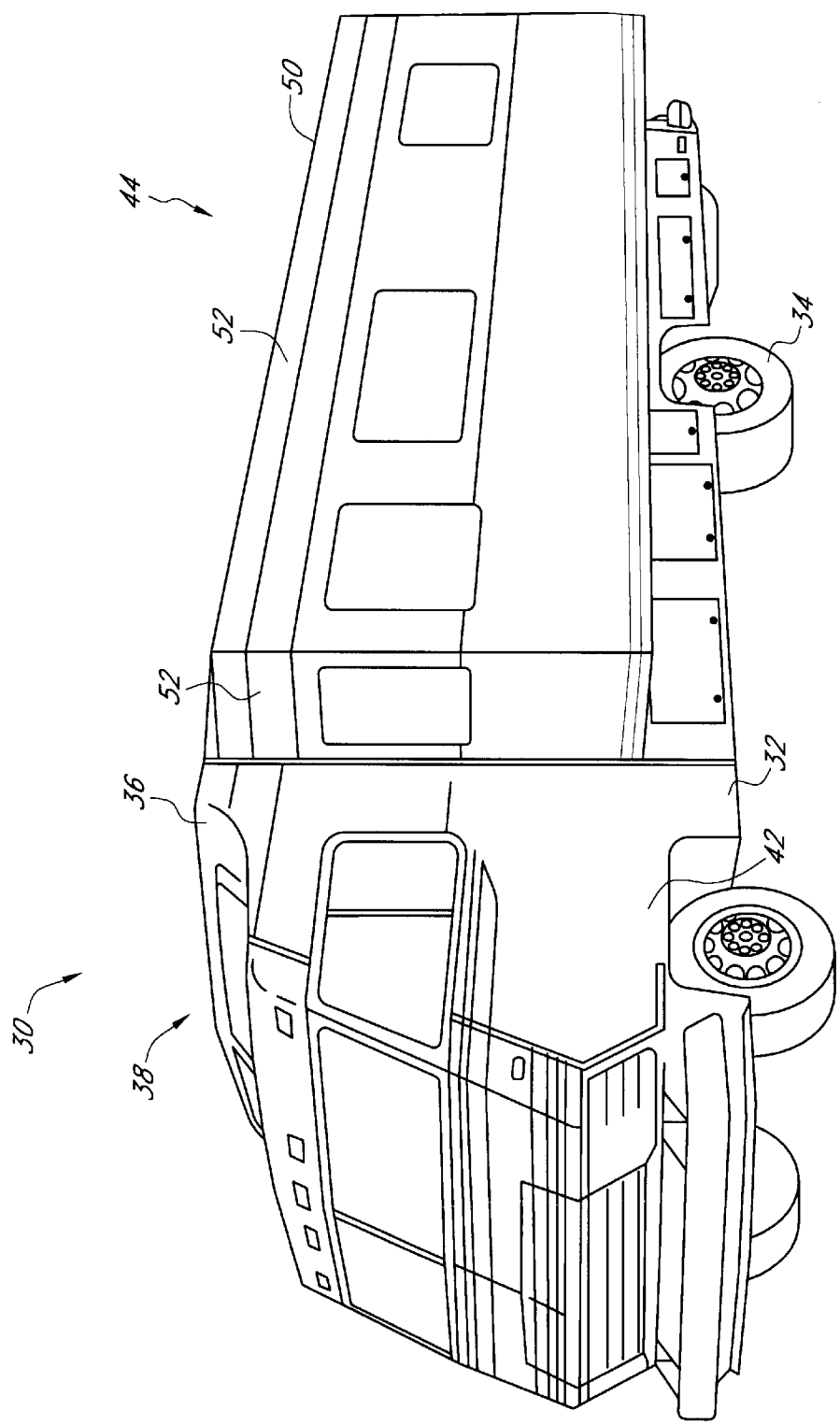
FIG. 1A is an exterior perspective view of one embodiment of a self-powered recreational vehicle of the present invention illustrating a slide-out member in a deployed position.
Figure 1B:
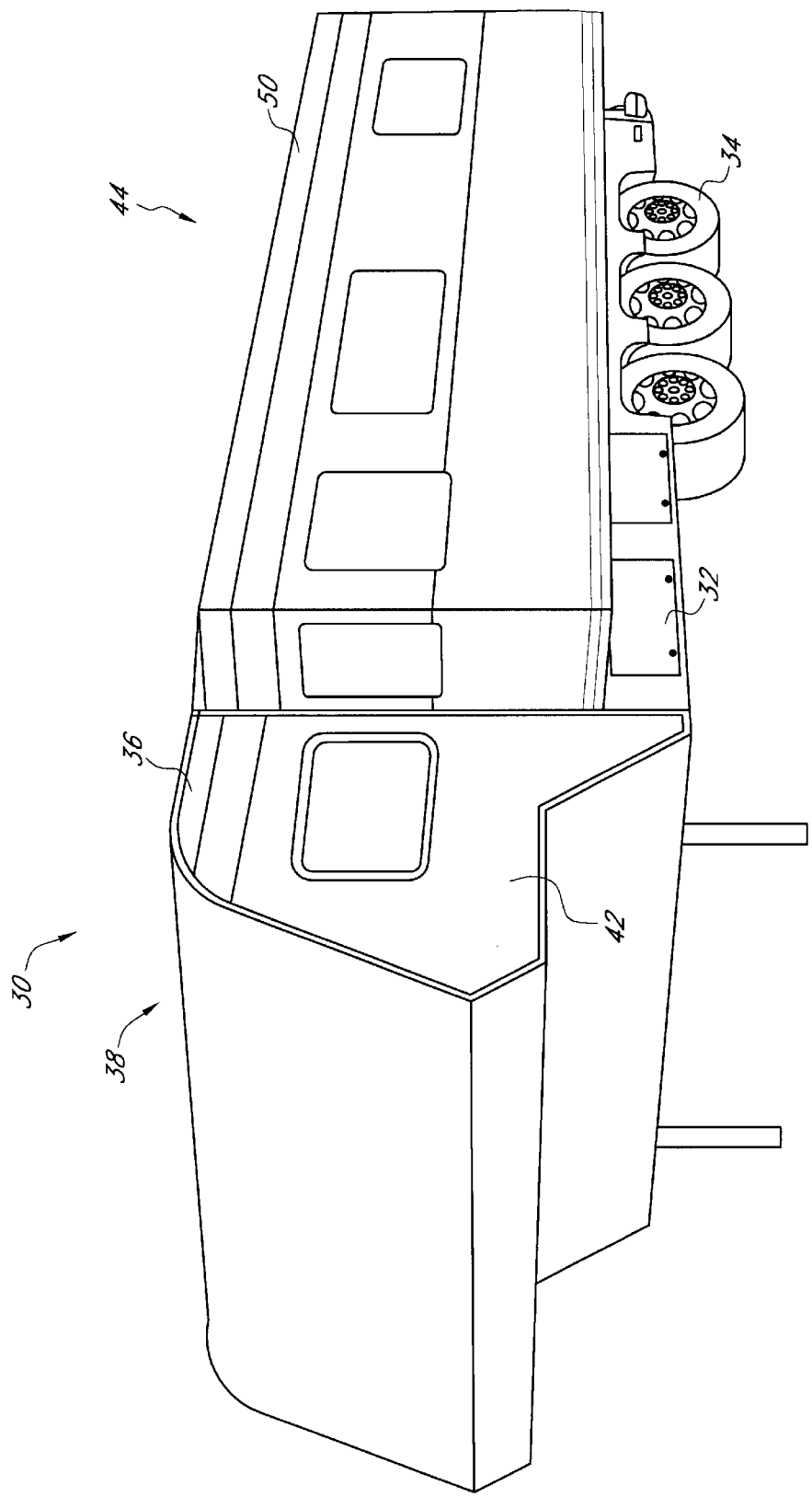
FIG. 1B is an exterior perspective view of another embodiment of a towable recreational vehicle of the present invention illustrating a slide-out member in a deployed position.
Figure 2A:
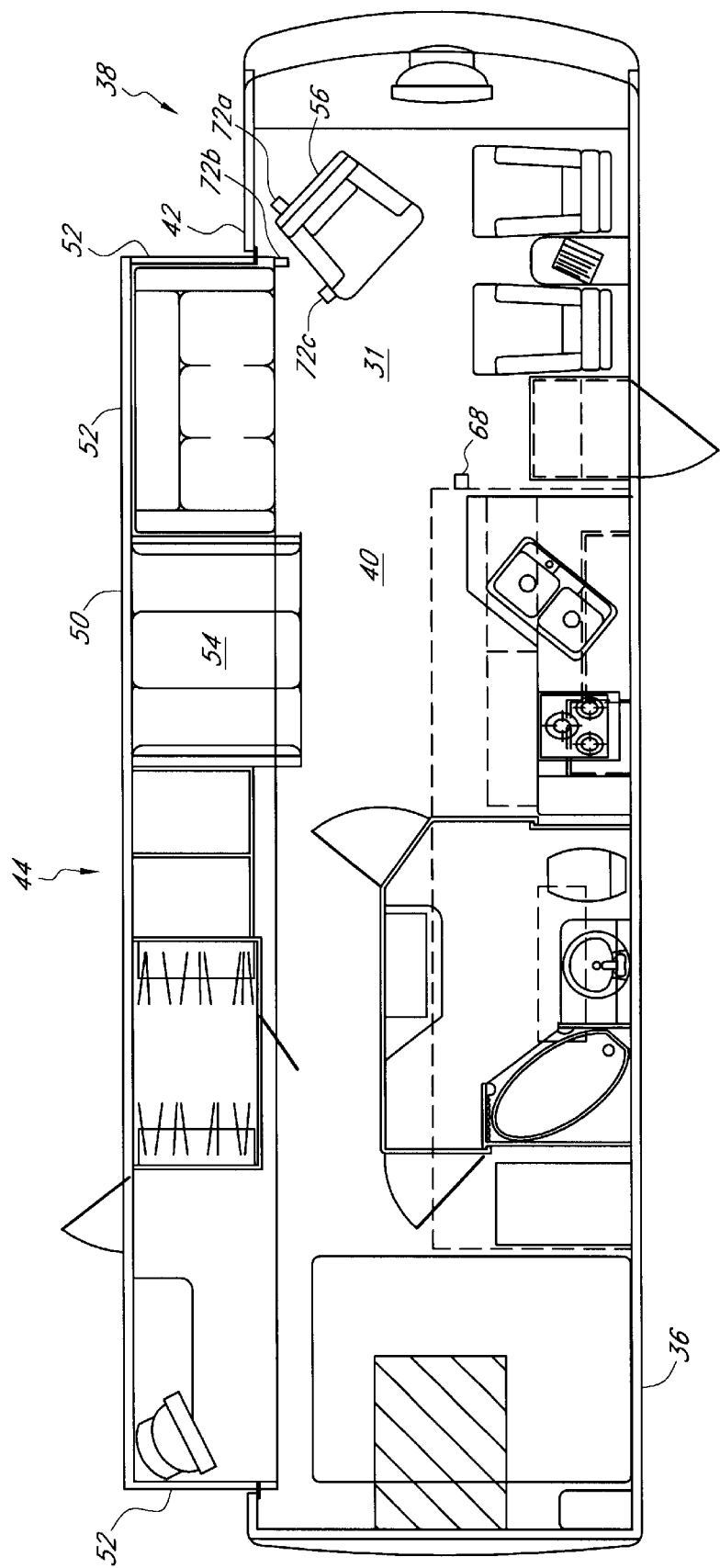
FIG. 2A is a sectional view of the recreational vehicle of FIG. 1 illustrating the interior layout of the recreational vehicle with the slide-out placed in the deployed position
Figure 2B:
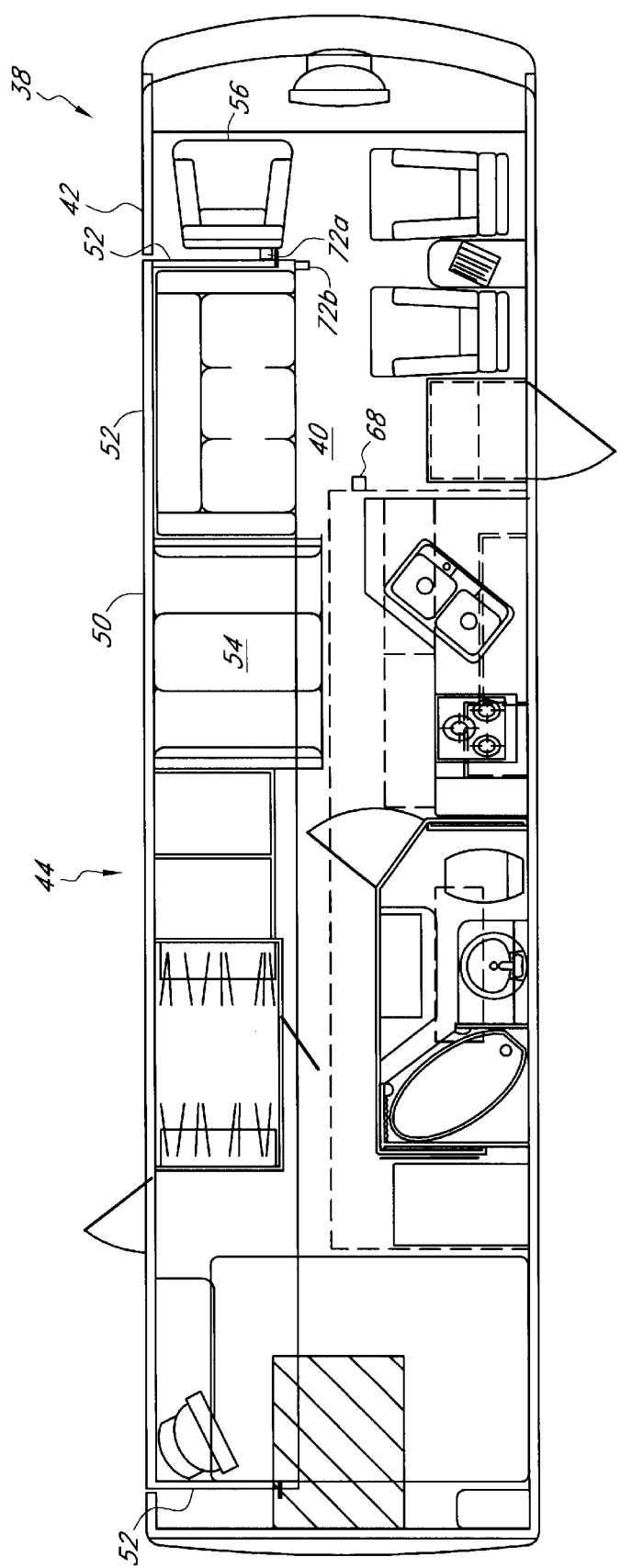
FIG. 2B is a sectional view of the recreational vehicle of FIG. 1 illustrating the interior layout of the recreational vehicle with the slide-out placed in a retracted position.
Figure 3:
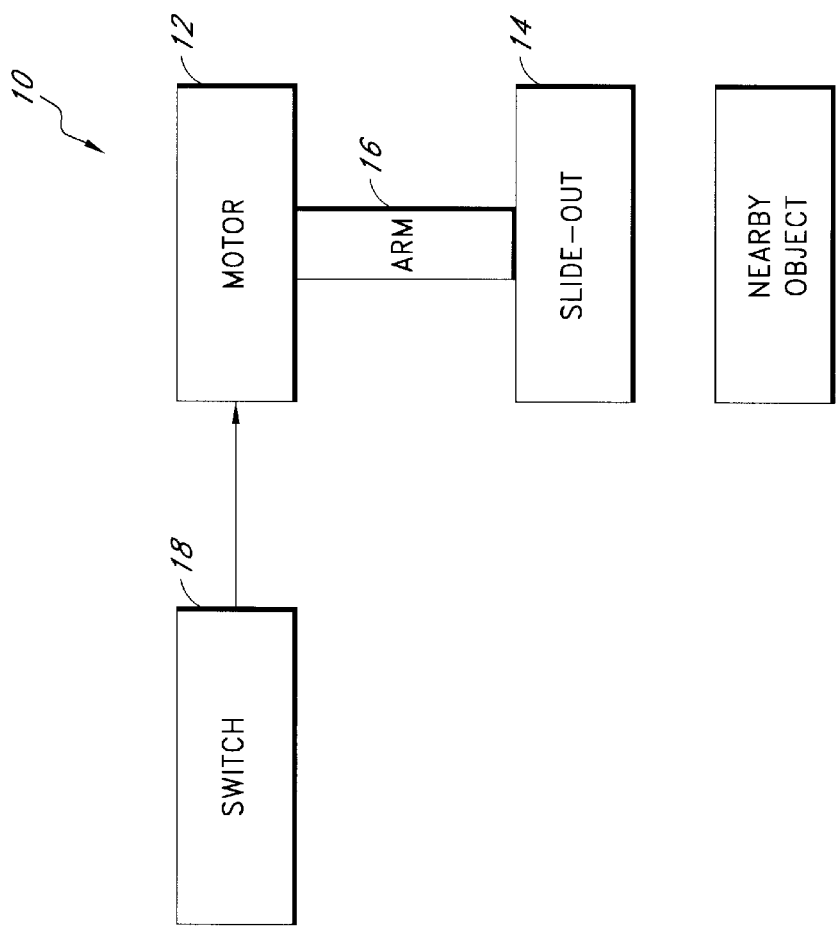
FIG. 3 is a schematic diagram of an exemplary actuator assembly of a recreational vehicle of the prior art.

As shown in FIGS. 1A–1B, the vehicle 30 comprises a chassis 32 having a plurality of rotatable wheels 34 extending downward therefrom, a housing member 36 disposed above the chassis, and the slide-out member 50 slidably extending from the housing member 36. The chassis 32 supports the housing member 36 and the wheels 34 allow the vehicle 30 to travel on a road. The housing member 36 comprises a plurality of walls 38 so as to define a main living space 40 therein (FIGS. 2A–2B). The plurality of walls 38 includes a first wall 42 having an opening 44 extending therethrough that is sized to allow the slide-out 50 to slide through the opening 44.

As shown in FIGS. 1A–2B, the slide-out 50 comprises a plurality of walls 52 so as to define a supplemental living space 54 therein. The slide-out 50 is slidably supported within the opening 44 of the housing 36 so that the slide-out 50 can be retracted within the opening 44 in a retracted position (FIG. 2B) such that a substantial portion of the slide-out 50 is disposed within the main living space 40 of the vehicle 30. Furthermore, the slide-out 50 is movable with respect to the main housing member 36 along a lateral direction so that the slide-out 50 can be placed in an extended position such that a substantial portion of the slide-out 50 is disposed outside of the vehicle 30 (FIG. 2A).

Consequently, when the slide-out 50 is in the retracted position, the recreational vehicle 30 is provided with a reduced external profile that allows the vehicle to travel on a public road. Furthermore, when the slide-out 50 is in the deployed position, the recreational vehicle 30 is provided with the enlarged overall interior living space 31 that includes both the main living space 40 of the housing member 36 and the supplemental living space 54 of the slide-out 50. As will be described in greater detail below, the recreational vehicle 30 further comprises an actuator assembly having a damage avoidance system for moving the slide-out 50 between the retracted and deployed positions such that the vehicle 30 is less likely to be damaged in the event that an object is disposed in the path of the slide-out 50.

In the illustrated embodiments of FIGS. 1A–2B, the slide-out 50 comprises a length measured along the longitudinal axis of the vehicle 30 that extends over most of the length of the vehicle 30. Thus, the supplemental interior living space 54 of the slide-out 50 greatly increases the interior living space 31 of the vehicle 30. However, it will be appreciated that, in another embodiment, the slide-out could have a reduced length such that the length of the slide-out is substantially less than the length of the vehicle. Furthermore, although the slide-out of the illustrated embodiments is shown horizontally extending from the driver-side of the vehicle in a lateral manner, it will be appreciated that, in other embodiments, the slide-out could extend in an alternative manner. For example, the slide-out could extend horizontally from the curb-side, horizontally from the rear in a longitudinal manner, or vertically above the vehicle.

In one embodiment, the vehicle 30 comprises at least one movable object which is disposed within the main living space of the vehicle adjacent the slide-out. The object is movable between a first position, such that the object is not in the path of the slide-out, and a second position, such that the object is in the path of the slide-out. Consequently, if the object happens to be in the second position when the slide-out is moved from the deployed position to the retracted position, the slide-out will likely collide with the object.

As shown in FIGS. 2A–2B, in one embodiment, the movable object is a chair 56 for supporting the weight of an individual. The chair 56 is pivotally mounted to the vehicle 30 such that the first position of the chair 56 corresponds to the chair 56 facing forward and such that the second position of the chair 56 corresponds to the chair 56 facing the center of the vehicle 30. In a preferred embodiment, the chair 56 is disposed at the front of the vehicle 30 adjacent the driver-side of the vehicle 30 so that the chair 56, in the first position (FIG. 2B), can support a driver when the driver is operating the vehicle 30. Furthermore, the chair 56 can be rotated to the second position (FIG. 2A) when the slide-out 50 is deployed so as to enable an individual seated in the chair 56 to face the center of the interior living space 31 of the vehicle 30.

In typical recreational vehicles having slide-out members adjacent a front swivel chair, the chair is usually disposed sufficiently far away from the slide-out so that the chair never interferes with the slide-out when the slide-out is moved from the deployed position to the retracted position. However, this requires reducing the length of the slide-out, thereby reducing the volume of the living space of the vehicle.

To accommodate a larger slide-out and, thus, provide the vehicle 30 with a larger interior living space, the chair 56 is disposed relatively close to the slide-out 50. In particular, a substantial portion of the chair 56 is disposed in the path of the slide-out 50 when the chair 56 faces the center of the vehicle 30 (FIG. 2A). Thus, if the slide-out 50 is moved into the retracted position while the chair 56 is facing the center of the vehicle 30, the slide-out 50 will collide with the chair 56 and possibly damage the vehicle 30. To reduce the risk of damage to the vehicle 30 from such a collision, the vehicle 30 of FIGS. 1A–2B includes an actuator assembly having a damage avoidance system that will be described in greater detail below.

Figure 4:
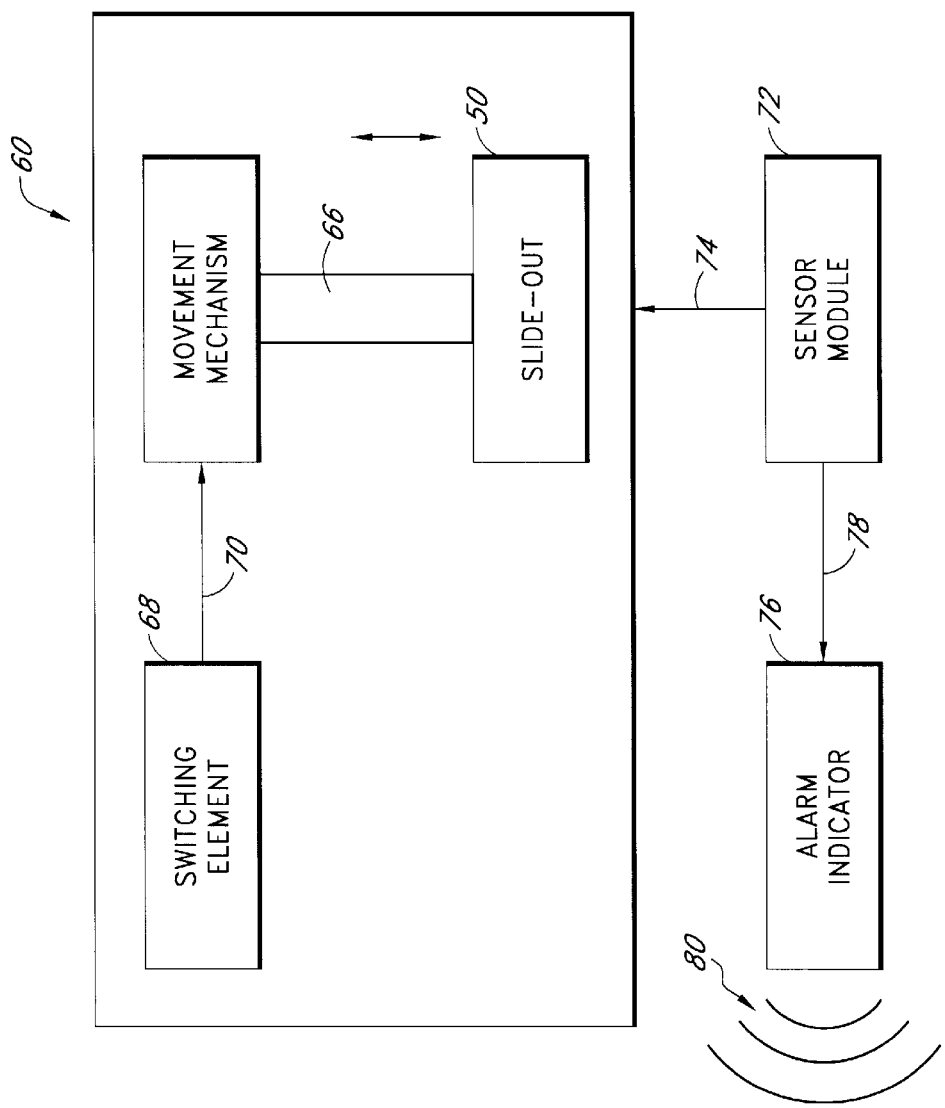
FIG. 4 is a schematic diagram of the actuator assembly of the recreational vehicle of FIGS. 1A and 1B that includes a damage avoidance system having a sensor for detecting if the slide-out is in an adverse state.

FIG. 4 illustrates an actuator assembly 60 according to one aspect of the present invention that is linked to a damage avoidance system 62. The actuator assembly 60 comprises a known movement mechanism 64 that is coupled to the slide-out 50 by way of a known movement arm 66. When the movement mechanism 64 is activated, the movement mechanism 64 directs the arm 66 to apply a force onto the slide-out 50 which moves the slide-out 50 preferably in a linear manner along a lateral axis extending from the vehicle 30.

For example, in one embodiment, the movement mechanism 64 comprises an electric motor for generating a torque and the movement arm 66 comprises a rotatable rod coupled to the motor. The rod includes a rack gear of a rack and pinion system that rotates in response to receiving the torque from the motor such that rotation of the rack gear results in translational motion of the slide-out 50. In another embodiment, the movement mechanism 64 comprises a hydraulic pump providing pressurized hydraulic fluid and the movement arm comprises a hydraulic linear actuator mechanism that receives the pressurized hydraulic fluid from the pump. The hydraulic actuator mechanism generates a force onto the slide-out 50 that moves the slide-out 50 between the retracted and deployed positions.

As shown in FIG. 4, the actuator assembly 60 further comprises a switching element 68. The switching element 68 is preferably disposed within the interior living space 31 of the recreational vehicle 30 so as to be accessible to the user (FIGS. 2A–2B). The switching element 68 is coupled to the movement mechanism 64 via a first communication path 70 such that activation of the switching element 68 by the user transmits one of a plurality of activation signals to the movement mechanism 64 via the communication path 70 that extends from the switching element 68 to the movement mechanism 64. The activation signals comprise a retraction signal that directs the movement mechanism 64 to retract the slide-out 50 and a deployment signal that directs the movement mechanism 64 to deploy the slide-out 50.

To reduce the likelihood that the vehicle will be damaged as a result of the slide-out colliding with another object, the actuator assembly 60 is linked to the damage avoidance system 62. As shown in FIG. 4, the damage avoidance system 62 is linked to the actuator assembly 60 and comprises a sensor module 72 having at least one sensor for determining if the slide-out 50 is in an adverse state. In particular, the slide-out 50 is in an adverse state when (a) a collision between the slide-out 50 and a nearby object is imminent, (b) a collision has recently occurred, or (c) an abnormally large resistive force is acting on the slide-out which substantially inhibits the actuator assembly 60 from moving the slide-out 50. As will be described in greater detail below, the sensor module 72 can be coupled to any of a number of locations of the vehicle 30, such as the chair 56 adjacent the slide-out 50, the slide-out 50, or to a component of the actuator assembly 60.

As shown in FIG. 4, the damage avoidance system 62 further comprises a second communication path 74 extending from the sensor module 72 that allows the sensor module 72 to communicate with the actuator assembly 60. In particular, when the damage avoidance system 62 determines that the slide-out 50 is in the adverse state described above, an override signal is transmitted from the sensor module 72 to the actuator assembly 62 via the communication path 74. Furthermore, upon detecting the presence of the override signal from the sensor module 72, the actuator assembly 60 is inhibited from applying a force onto the slide-out 50 as will be further described below.

In one embodiment, the damage avoidance system 62 further comprises an alarm indicator 76 that receives the override signal from the sensor module 72 via a third communication path 78 that extends from the sensor module 72 to the alarm indicator 76. The alarm indicator 76 is preferably disposed adjacent the switching element 68 and is provided to notify the user that the slide-out 50 is in the adverse state. The alarm indicator 76 can be selected from any of a number of known alarm indicator devices such as an audible tone generator or a visible light generator. Upon receiving the override signal from the sensor while the user is attempting to reposition the slide-out 50, the alarm indicator 76 produces a user detectable signal 80, such as an audible tone or a beam of light, so as to notify the user that the slide-out 50 is in the adverse state.

Consequently, upon receiving the user detectable signal 80 from the alarm indicator 76, the user can take corrective action to rectify the slide-out 50. For example, if the problem is related to a nearby object being in the path of the slide-out 50, the user can move the nearby object so that the nearby object is longer in the path of the slide-out.

In another embodiment, the slide-out 50 may be exposed to large resistive forces that cause the damage avoidance system 62 to disable the actuator assembly 60 even after nearby objects are moved away from the slide-out 50. For example, these forces could be due to the slide-out 50 being improperly aligned with respect to the vehicle 30. Upon receiving the alarm signal 80, the user can then attempt to manually realign the slide-out 50 or have a service professional examine the vehicle 30.

Figure 5:
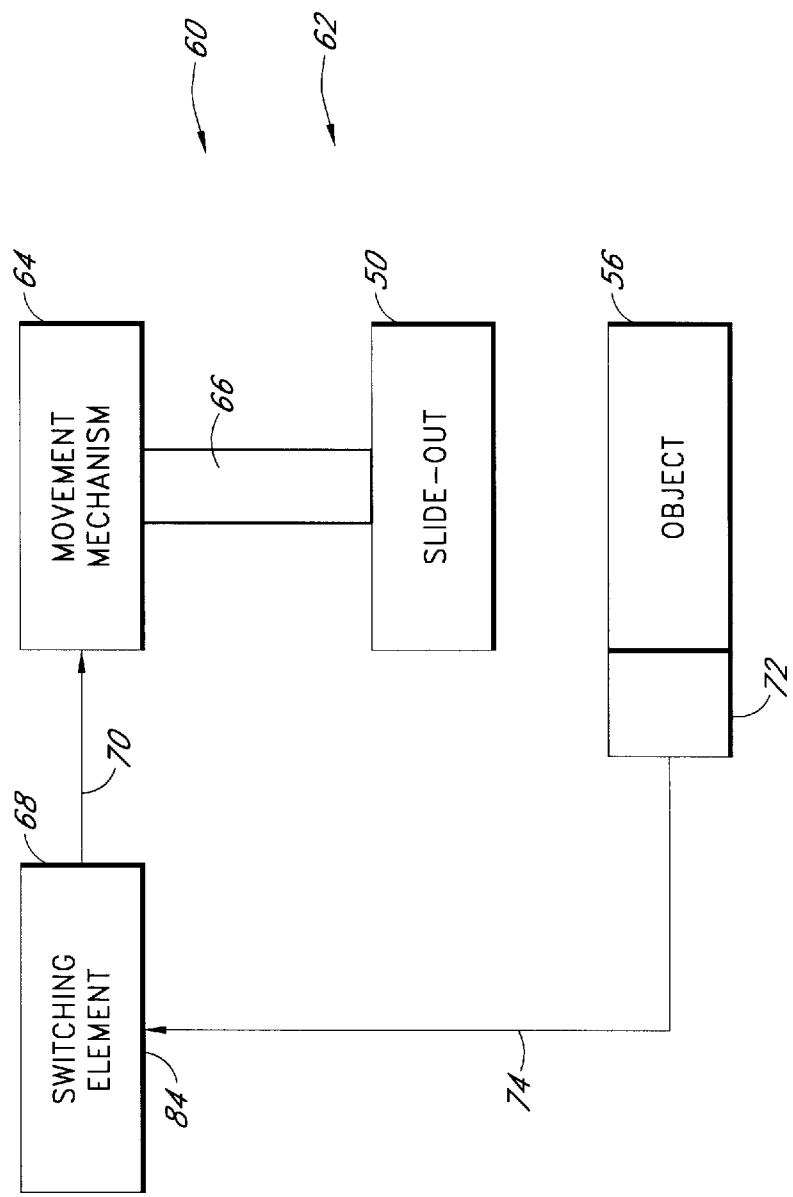
FIG. 5 is a schematic diagram of one embodiment the actuator assembly of FIG. 4 illustrating the sensor coupled to a movable object disposed within the recreational vehicle of FIGS. 1A–2B.

FIG. 5 illustrates one embodiment of the actuator assembly 60 of FIG. 4, wherein the sensor module 72 is disposed adjacent a moveable object, such as the chair 56 (FIGS. 2A–2B) disposed within the interior living space of the vehicle 30. Furthermore, the switching element 68 further comprises an override input 84 for receiving the override signal that travels along the second communication path extending from the sensor module 72 to the override input 84. In the preferred embodiments, a sensor of the sensor module 72 is disposed adjacent the chair 56 as indicated by the reference numeral 72a in FIGS. 2A–2B.

For example, in one embodiment, the sensor 72a comprises an orientation detector, such as an optical shaft encoder, that determines whether the chair 56 is in the first position such that the chair is pointed forward and is not in the path of the slide-out 50. If the sensor 72a detects that the chair 56 is not in the first position, i.e. facing forward, then the sensor module 72 generates the override signal. In another embodiment, the sensor 72a comprises a proximity sensor that estimates the closest distance between the chair 56 and the slide-out 50 such that the override signal is produced if the closest distance is less than a preset safe distance. Thus, in these embodiments, the override signal indicates that a collision between the chair 56 and the slide-out 50 would likely occur if the slide-out 50 were allowed to move into the retracted position.

In another embodiment, the sensor 72a comprises a shock detector that determines whether an impulse of sufficient magnitude has been imparted onto the chair 56. Thus, in this embodiment, the override signal indicates that it is likely that a collision has already occurred.

In one embodiment, upon receiving the override signal, the switching element 68 is only inhibited from transmitting the retraction signal to the movement mechanism. This is useful for reducing the likelihood that the vehicle will be damaged due to a collision between the slide-out and a nearby object disposed within the interior living space of the vehicle. In another embodiment, upon receiving the override signal, the switching element 68 is inhibited from transmitting both the retraction signal and the deployment signal. In addition to reducing the likelihood that the vehicle 30 will be damaged by an object disposed within the interior living space 31, it also reduces the likelihood that the vehicle 30 will be damaged as a result of the slide-out 50 colliding with an external object, such as a tree or building, disposed outside of the vehicle 30.

Figure 6A:
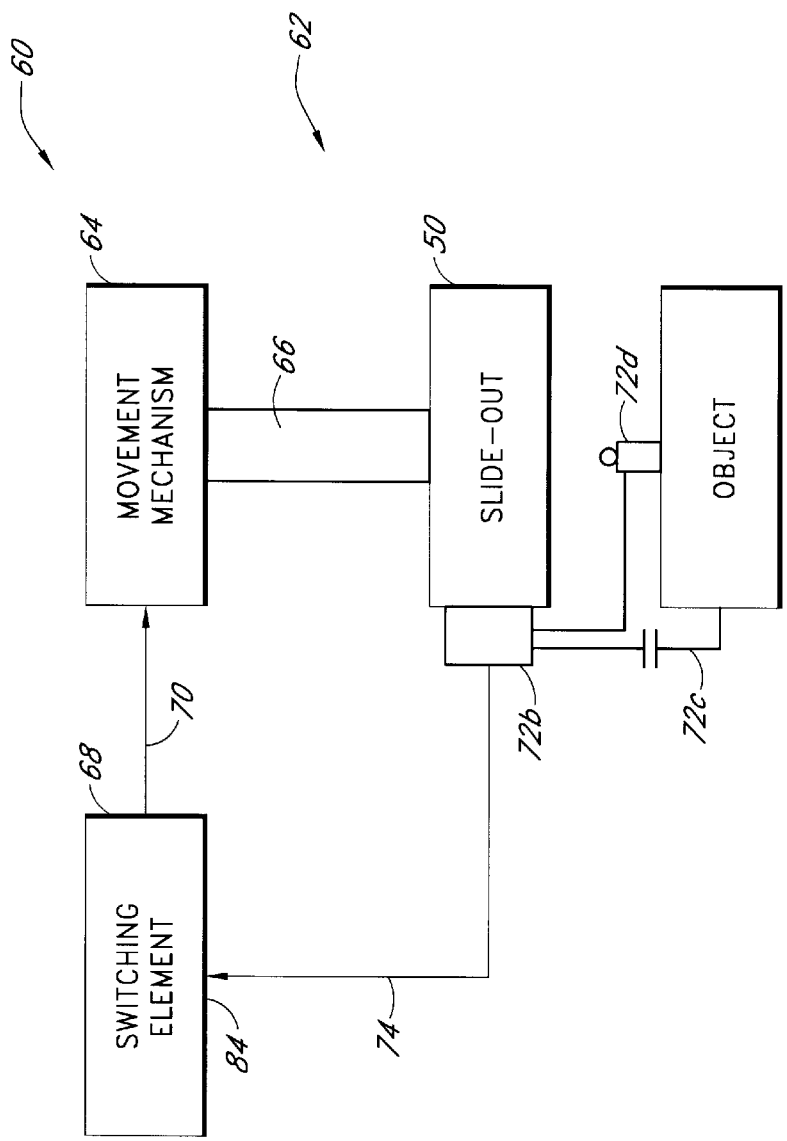
FIG. 6A is a schematic diagram of another embodiment the actuator assembly of FIG. 4 illustrating the sensor coupled to the slide-out.

FIG. 6A illustrates another embodiment of the actuator assembly 60 of FIG. 4. In particular, a sensor 72b of the sensor module 72 is disposed adjacent the slide-out 50 shown in FIGS. 2A–2B. In one embodiment, the sensor 72b is a shock sensor coupled to the slide-out 50 so the mechanical vibrations can travel therebetween. The shock sensor 72b detects if a sufficiently strong impulse has been imparted onto the slide-out 50. Upon detecting such an impulse, the sensor module 72 produces the override signal that indicates a high likelihood that the slide-out 50 has already collided with a nearby object. In another embodiment, the sensor 72b comprises a proximity sensor that determines the likelihood that the nearby object is in the path of the slide-out 50.

FIG. 6A illustrates yet another embodiment of the actuator assembly 60 of FIG. 4. In this embodiment, the slide-out 50 is equipped with a limit switch 72b (FIG. 2A) that is positioned so as to contact a metal strip 72c (FIG. 2A) positioned on the chair 56 such that when the chair 56 is positioned in front of the slide-out 50 the limit switch 72b contacts the metal strip 72c. A signal can thus be sent to the movement mechanism 64 via the switching element 68 in response to the limit switch 72b contacting the metal strip 72c to thereby cause the movement mechanism 64 to cease movement of the slide-out 50.

Figure 6B:
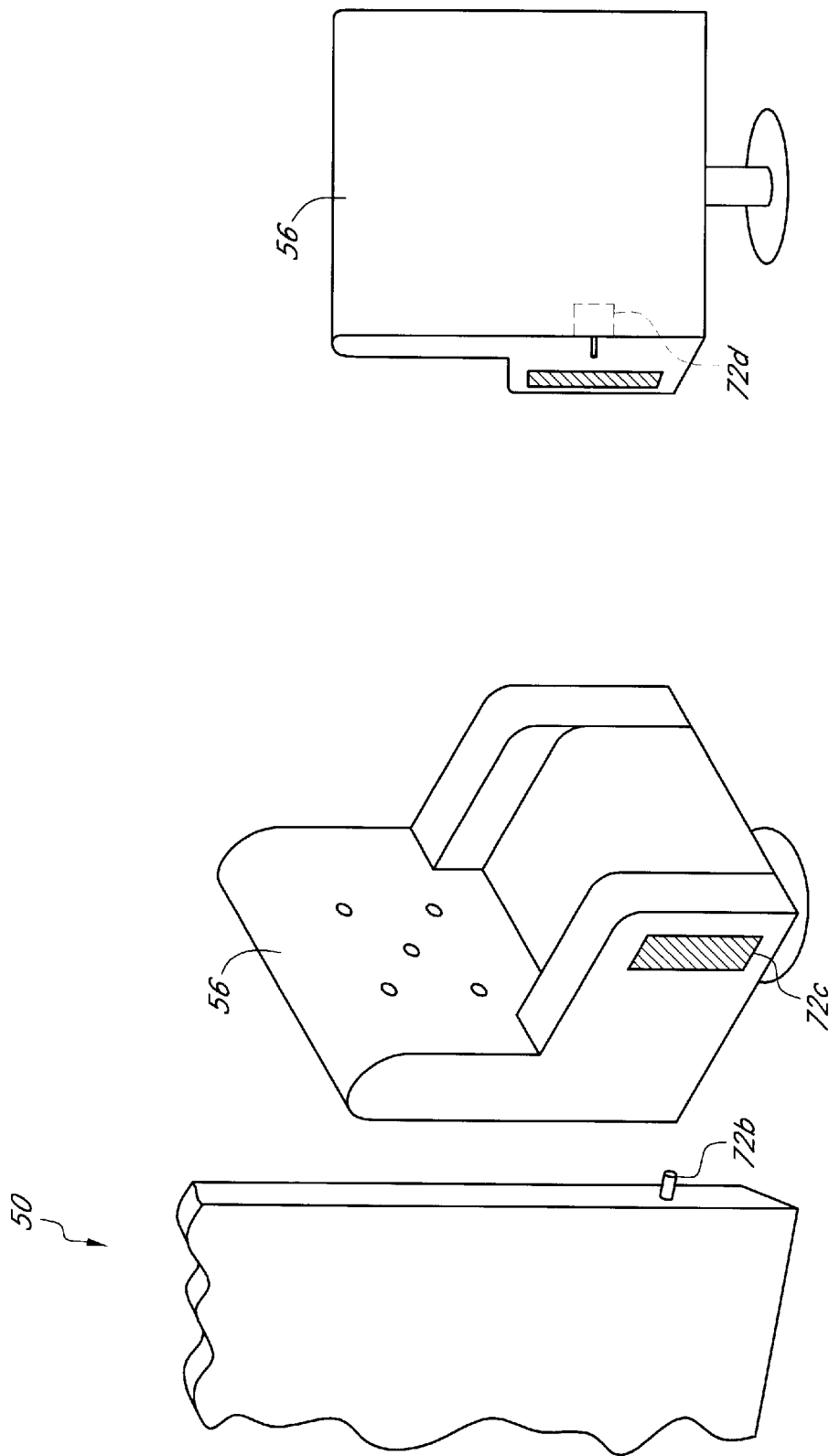
FIG. 6B is a simplified isometric illustration of one embodiment of the actuator assembly of FIG. 4 illustrating that the damage avoidance system can be mounted either on the wall of the slide out or in the object that is to be avoided.

FIGS. 6A and 6B further illustrate yet another embodiment of the damage avoidance system. In particular, the chair 56 can be equipped with the metal strip 72c that can contact a limit switch 72b mounted on the wall of the slide out 50 in the manner described above in connection with FIG. 6A. Alternatively, a limit switch 72d can be mounted within the chair 56 and the metal strip 72c can be mounted such that when the wall of the slide out 50 contacts the metal strip 72c, the strip contacts the limit switch 72d which is wired so that it sends a signal to the movement mechanism 64 via the communication path 74 and the switching element 68 to disengage the actuator assembly 60 of FIG. 4. In this way, the movement of the slide out can be stopped when it contacts the chair 56 prior to damaging the slide out or the chair.

The use of a metal strip may be preferred as it dissipates the force of impact of the wall 50 over a larger area thereby inhibiting damage to the chair 56 prior to disengagement of the actuator assembly. Moreover, the limit switch 72d can be mounted inside of the chair 56 in a location where it is not visible and the metal strip 56 can be mounted either above the fabric of the chair or underneath the fabric of the chair to preserve the overall aesthetic appearance of the chair 56. Hence, the damage avoidance system can either be mounted on the wall of the slide out 50, in the chair 56 or in some combination thereof without departing from the spirit of the present invention.

Figure 7:
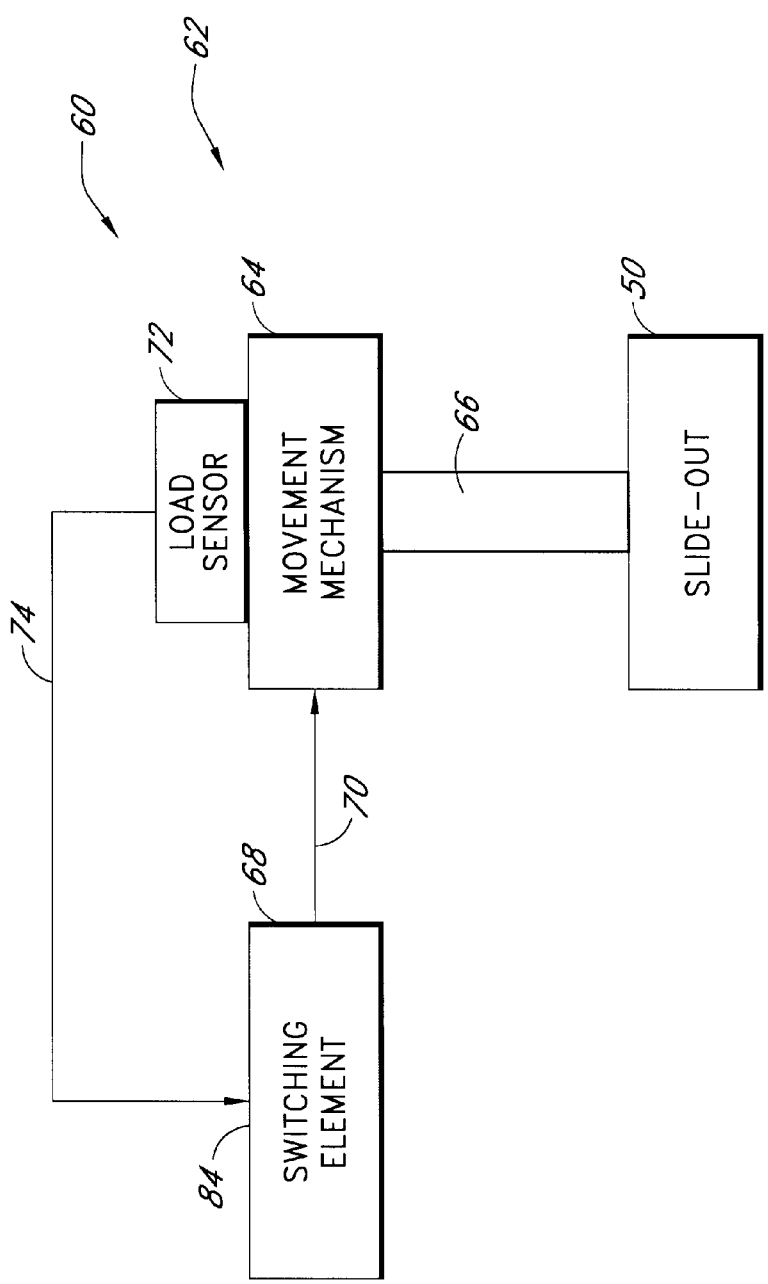
FIG. 7 is a schematic diagram of yet another embodiment the actuator assembly of FIG. 4 illustrating the sensor coupled to a movement mechanism of the actuator assembly.

FIG. 7 illustrates yet another embodiment of the actuator assembly 60 of FIG. 4. In particular, the sensor module 72 is coupled to the movement mechanism 64 so as to monitor the load on the movement mechanism 64. Because the load on the movement mechanism 64 is determined in part by resistive forces acting on the slide-out 50, monitoring the load on the movement mechanism 64 provides a means for determining whether large resistive forces are being applied onto the slide-out 50.

For example, in one embodiment, the sensor module 72 monitors the torque provided by an electric motor by monitoring the electric current drawn by the motor. In another embodiment, the sensor module 72 monitors the hydraulic fluid pressure provided by a hydraulic pump. If the sensor module 72 determines that the load on the movement mechanism is greater than a preset safe threshold, then the sensor module 72 transmits the override signal to the switching element 68 so as to inhibit the switching element 68 from activating the movement mechanism 64.

Thus, it will be appreciated that the damage avoidance system 62 of the recreational vehicle 30 of the present invention reduces the likelihood that the recreational vehicle 30 will become damaged as a result of the slide-out 50 colliding with a nearby object. This is accomplished by detecting whether the slide-out 50 is in the adverse state and, upon detecting that the slide-out 50 is in the adverse state, by inhibiting the actuator assembly 60 from applying forces onto the slide-out 50. Consequently, in the embodiments that determine that an imminent collision between the slide-out 50 and a nearby object is likely, the slide-out 50 is less likely to undergo such a collision. Moreover, in the embodiments that determine that a collision has already occurred or that large external forces are acting on the slide-out 50, the movement mechanism 60 is inhibited from continuing to exert a force onto the slide-out 50, thereby reducing unnecessary stress within the actuator assembly 60.

It will also be appreciated that the damage avoidance system 62 allows the slide-out 50 to have a greater size. In particular, because the damage avoidance system can be configured to reduce the likelihood that the vehicle 30 will be damaged as a result of the slide-out 50 colliding with the driver's chair 56, the slide-out 50 can be enlarged such that the rearward facing chair 56 is in the path of the slide-out 50.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appended claims.

What is claimed is:

1. A recreational vehicle comprising:
   a chassis having a plurality of rotatable wheels extending therefrom;
   a main housing member disposed above the chassis, said main housing member comprising a plurality of walls that define a main interior living space therebetween and an opening that extends from the main interior living space;
   a slide-out member disposed within the opening of the main housing member, said slide-out member comprising a plurality of walls that define a supplemental living space therebetween, wherein the slide-out member is movable between (a) a retracted position such that a substantial portion of the slide-out is disposed within the main interior living space and (b) a deployed position such that a substantial portion of the slide-out is disposed outside of the main interior living space so as to provide the vehicle with an increased overall living space that includes the main interior living space of the main housing member and the supplemental living space of the slide-out member.
   an actuator assembly that, when activated, urges the slide-out member to move between the retracted position and the deployed position; and
   a damage avoidance system that reduces the likelihood that the slide-out member will be damaged as a result of the slide-out member colliding with an object disposed in the path of the slide-out member.

2. The vehicle of claim 1, wherein the damage avoidance system comprises a sensor module for determining if the slide-out member is in an adverse state.

3. The vehicle of claim 2, wherein the damage avoidance system inhibits the actuator assembly from applying a force onto the slide-out member while the slide-out member is in the adverse state.

4. The vehicle of claim 3, wherein the slide-out member is in the adverse state if the nearby object is disposed in the path of the slide-out member.

5. The vehicle of claim 3, wherein the slide-out member is in the adverse state if the slide-out member has collided with the nearby object.

6. The vehicle of claim 3, wherein the slide-out member is in the adverse state if abnormally large resistive forces are acting on the slide-out member.

7. The vehicle of claim 3, wherein the sensor module comprises a first sensor which is coupled to a movable object disposed within the main interior living space.

8. The vehicle of claim 7, wherein the first sensor detects whether an impulse has been imparted onto the moveable object.

9. The vehicle of claim 7, wherein the first sensor estimates the closest distance between the moveable object and the slide-out member.

10. The vehicle of claim 7, wherein the moveable object is a chair disposed adjacent a front end of the recreational vehicle.

11. The vehicle of claim 10, wherein the chair is not in the path of the slide-out member when the chair is in a first orientation, and wherein a first portion of the chair is in the path of the slide-out member when the chair is in a second orientation.

12. The vehicle of claim 11, wherein the first sensor determines whether the chair is in the first orientation.

13. The vehicle of claim 3, wherein the sensor module comprises a first sensor which is coupled to the slide-out member.

14. The vehicle of claim 13, wherein the first sensor determines if an impulse has been imparted onto the slide-out member.

15. The vehicle of claim 13, wherein the sensor module determines if the nearby object is in the path of the slide-out member.

16. The vehicle of claim 3, wherein the actuator assembly comprises a movement mechanism and a movement arm extending from the movement mechanism, said movement mechanism directing the movement arm to apply a force onto the slide-out member.

17. The vehicle of claim 16, wherein the sensor module comprises a load sensor for measuring the load exerted onto the movement mechanism.

18. The vehicle of claim 17, wherein the movement mechanism is an electric motor for generating a torque and the load sensor monitors the torque exerted by the electric motor.

19. The vehicle of claim 18, wherein the load sensor monitors the current drawn by the electric motor.

20. The vehicle of claim 16, wherein the sensor module generates an override signal upon determining if the slide-out member is in the adverse state.

21. The vehicle of claim 20, wherein the actuator assembly further comprises a switching element and a first communication path extending from the switching element to the movement mechanism, said switching element in a first activated state transmitting an activation signal to the movement mechanism over the first communication path that activates the movement mechanism to move the slide-out member.

22. The vehicle of claim 21, wherein the switching element comprises an override input for receiving an override signal, wherein the switching element is inhibited from transmitting the activation signal while receiving the override signal at the override input.

23. The vehicle of claim 22, wherein the actuator assembly further comprises a second communication path extending from the sensor module to the override input of the switching element, said sensor module transmitting the override signal via the second communication path upon determining that the slide-out member is in the adverse state.

24. A recreational vehicle comprising:
- a chassis having a plurality of rotatable wheels extending therefrom;
- a main housing member disposed above the chassis, said main housing member comprising a plurality of walls that define a main interior living space therebetween and an opening that extends from the main interior living space;
- a slide-out member disposed within the opening of the main housing member, said slide-out member comprising a plurality of walls that define a supplemental living space therebetween, wherein the slide-out member is moveable between (a) a retracted portion such that a substantial portion of the slide-out is disposed within the main interior living space and (b) a deployed position such that a substantial portion of the slide-out is disposed outside of the main interior living space so as to provide the vehicle with an increased overall living space that includes the main interior living space of the main housing member and the supplemental living space of the slide-out member.
- an actuator assembly that, when activated, urges the slide-out member to move between the retracted position and the deployed position; and
- a damage avoidance system that reduces the likelihood that the slide-out member will be damaged as a result of the slide-out member colliding with an object disposed in the path of the slide-out member, wherein the damage avoidance system comprises a sensor module for determining if the slide-out member is in an adverse state, said sensor module inhibiting the actuator assembly from applying a force onto the slide-out member when the slide-out is in the adverse state.

25. The vehicle of claim 24, wherein the slide-out member is in the adverse state if (a) the mearby object is disposed in the path of the slide-out member, (b) the slide-out member has collided with the nearby object, or (c) abnormally large resistive forces are acting on the slide-out member.

26. The vehicle of claim 24, further comprising a chair that is moveable between a first and a second orientation such that the chair, in the first orientation is in the path of the slide out member when the slide out member is retracting and wherein the sensor module is mounted within the chair such that when the slide out member contacts the chair, the sensor module sends a signal to stop the actuator assembly from moving the sldie out member.

27. The vehicle of claim 26, wherein the sensor module comprises:
- a strip of metal mounted on the chair in a location wherein the slide out member will contact the strip of metal when the slide out member is being retracted and the chair is in the first orientation; and
- a limit switch positioned within the chair such that when the slide out member contacts the strip of metal, the strip of metal contacts the limit switch and causes the limit switch to send a signal to the actuator assembly to disengage the actuator assembly.

* * * * *